US 11,725,681 B2

United States Patent
Fluhrer

(10) Patent No.: US 11,725,681 B2
(45) Date of Patent: Aug. 15, 2023

(54) CONNECTING ELEMENT FOR CONNECTING PROFILE ELEMENTS

(71) Applicant: SCHLETTER INTERNATIONAL B.V., Amsterdam (NL)

(72) Inventor: Dieter Fluhrer, Reichertsheim (DE)

(73) Assignee: SCHLETTER INTERNATIONAL B.V., Amsterdam (NL)

( * ) Notice: Subject to any disclaimer, the term of this patent is extended or adjusted under 35 U.S.C. 154(b) by 340 days.

(21) Appl. No.: 17/048,495

(22) PCT Filed: Apr. 15, 2019

(86) PCT No.: PCT/EP2019/059617
§ 371 (c)(1),
(2) Date: Oct. 16, 2020

(87) PCT Pub. No.: WO2019/201832
PCT Pub. Date: Oct. 24, 2019

(65) Prior Publication Data
US 2021/0172467 A1    Jun. 10, 2021

(30) Foreign Application Priority Data
Apr. 16, 2018    (EP) .................................... 18167538

(51) Int. Cl.
*F16B 21/02*        (2006.01)
*F16B 7/04*         (2006.01)
(Continued)

(52) U.S. Cl.
CPC ............ *F16B 21/02* (2013.01); *F16B 7/0446* (2013.01); *E06B 3/9641* (2013.01); *E06B 3/9642* (2013.01); *F16B 2/18* (2013.01)

(58) Field of Classification Search
CPC ...... F16B 7/025; F16B 7/0446; F16B 7/0433; F16B 7/046; F16B 7/187; F16B 7/0453; E06B 3/9642
See application file for complete search history.

(56) References Cited

U.S. PATENT DOCUMENTS 4,830,531 A * 5/1989 Condit .................. F16B 37/045
                                                 403/348
5,173,001 A * 12/1992 Schunke ................ F16B 7/187
                                                 403/255
(Continued)

FOREIGN PATENT DOCUMENTS

DE        29503767 U1    1/1997
DE        10146492 A1    4/2003
(Continued)

OTHER PUBLICATIONS

International Search Report issued for Application No. PCT/EP2019/059617 dated Jun. 18, 2019.
(Continued)

*Primary Examiner* — Daniel J Wiley
(74) *Attorney, Agent, or Firm* — Moore & Van Allen, PLLC; Henry B. Ward, III

(57) ABSTRACT

A connecting element for connecting at least two profile elements, wherein the connecting element is rotatable about an axis of rotation to produce a clamping force, wherein the connecting element has at least one first connecting section and at least one second connecting section, which are each designed to be received in one of the profile elements, wherein the first connecting section has at least one first clamping face, wherein the at least one first clamping face has a predetermined clamping contour, wherein the second connecting section has at least one second clamping face, wherein the first clamping face faces the second connecting section and the second clamping face faces the first con-
(Continued)

necting section, wherein the first connecting section and the second connecting section are formed such that the profile elements connected by the connecting element extend obliquely relative to each other or crosswise.

20 Claims, 15 Drawing Sheets

(51) Int. Cl.
*E06B 3/964* (2006.01)
*F16B 2/18* (2006.01)

(56) References Cited

U.S. PATENT DOCUMENTS

| | | | | |
|---|---|---|---|---|
| 5,199,836 | A * | 4/1993 | Gogarty | F16B 37/045 411/84 |
| 5,785,359 | A * | 7/1998 | Nagai | F16B 7/046 403/255 |
| 5,806,897 | A * | 9/1998 | Nagai | B23Q 1/0018 285/125.1 |
| 6,193,281 | B1 * | 2/2001 | Nagai | F16L 41/08 285/125.1 |
| 6,726,117 | B2 * | 4/2004 | Herb | F16B 37/046 238/315 |
| 7,444,922 | B2 * | 11/2008 | Harashima | F15B 13/0839 92/88 |
| 8,100,600 | B2 * | 1/2012 | Blum | F16B 37/045 403/256 |
| 9,599,136 | B2 * | 3/2017 | Rixen | F16B 7/187 |
| 10,962,041 | B2 * | 3/2021 | Meyer | F16B 7/187 |
| 2002/0098035 | A1 * | 7/2002 | Karlinger | F16B 37/045 403/187 |
| 2003/0036314 | A1 * | 2/2003 | Schmalzhofer | F16B 7/187 439/680 |
| 2004/0033103 | A1 * | 2/2004 | Ludwig | F16B 7/187 403/188 |
| 2005/0260032 | A1 * | 11/2005 | Band | F16B 7/187 403/252 |
| 2006/0133893 | A1 * | 6/2006 | Harashima | F15B 15/1404 403/331 |
| 2007/0257159 | A1 | 11/2007 | Nelson et al. | |
| 2011/0121153 | A1 * | 5/2011 | Magno, Jr. | F16B 7/187 248/316.1 |
| 2012/0193310 | A1 * | 8/2012 | Fluhrer | F24S 25/30 248/316.4 |
| 2013/0320175 | A1 * | 12/2013 | Kemple | F24S 25/65 248/316.1 |
| 2014/0182662 | A1 | 7/2014 | West et al. | |
| 2015/0023759 | A1 * | 1/2015 | Klopfenstein, II | F16B 21/04 411/354 |
| 2015/0136571 | A1 | 5/2015 | Askerdal et al. | |
| 2015/0211560 | A1 * | 7/2015 | Rixen | F16B 7/048 403/188 |
| 2015/0311606 | A1 * | 10/2015 | Meine | F24S 25/636 439/100 |
| 2016/0282016 | A1 * | 9/2016 | Ash | H02S 30/10 |
| 2017/0051770 | A1 * | 2/2017 | Flaig | F16B 7/187 |
| 2017/0259464 | A1 * | 9/2017 | Scheungraber | F16B 7/06 |
| 2020/0039033 | A1 * | 2/2020 | Lai | B25B 5/16 |
| 2020/0165810 | A1 * | 5/2020 | O'Brien | B65D 90/08 |
| 2020/0392975 | A1 * | 12/2020 | Meyer | F16B 37/045 |

FOREIGN PATENT DOCUMENTS

| | | |
|---|---|---|
| DE | 10315045 A1 | 10/2004 |
| DE | 102006047345 A1 | 4/2007 |
| GB | 1410993 A | 10/1975 |
| WO | 2014007747 A1 | 1/2014 |

OTHER PUBLICATIONS

Written Opinion issued for Application No. PCT/EP2019/059617 dated dated Jun. 18, 2019.
Office Action issued by the European Patent Office for European Patent Application No. 18 167 538.0, dated Mar. 10, 2023.

* cited by examiner

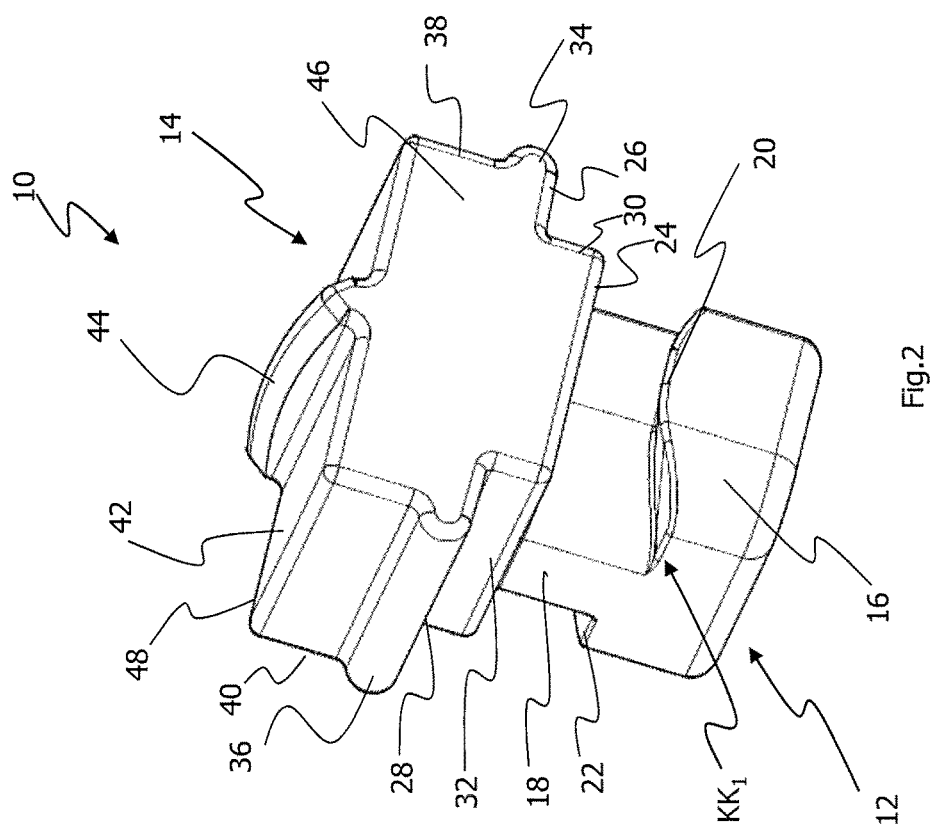
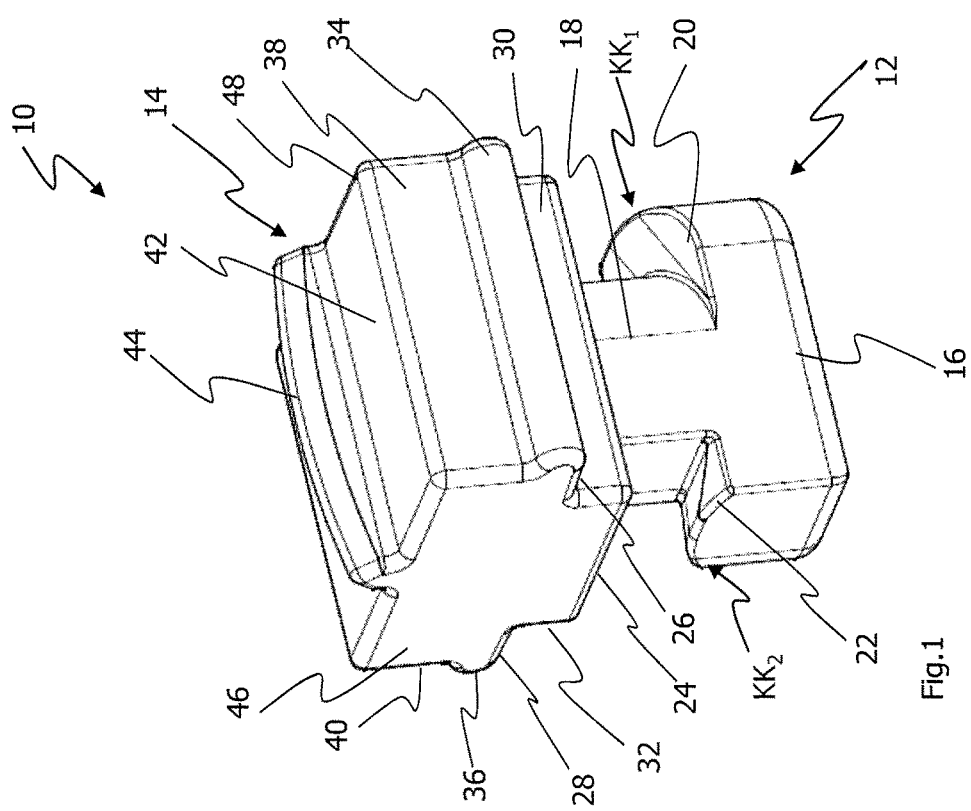

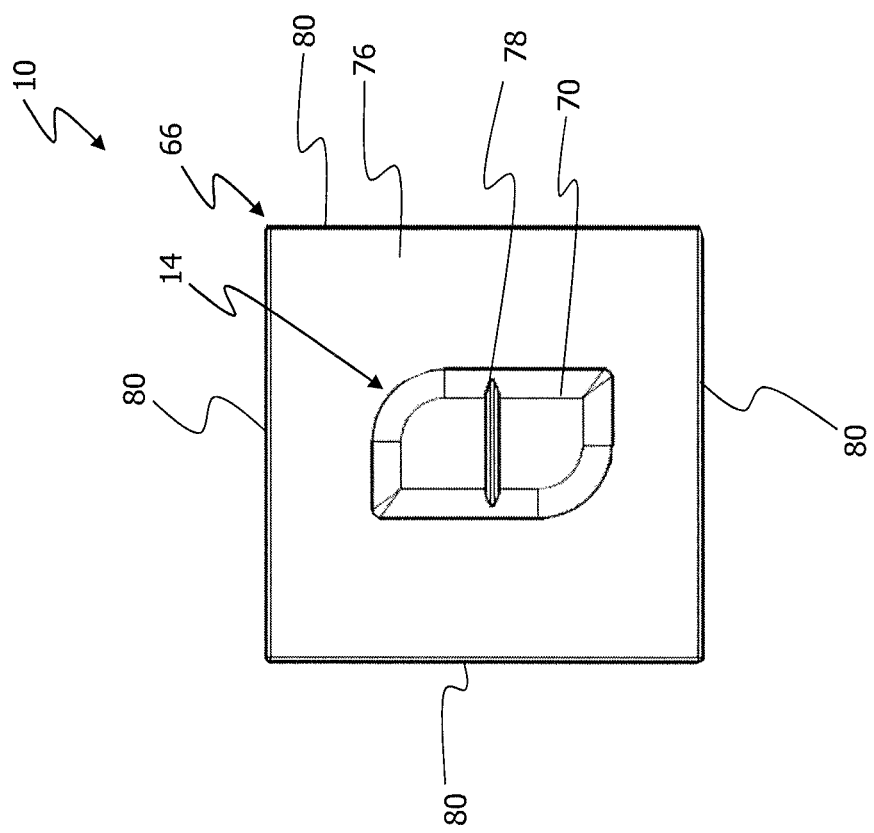

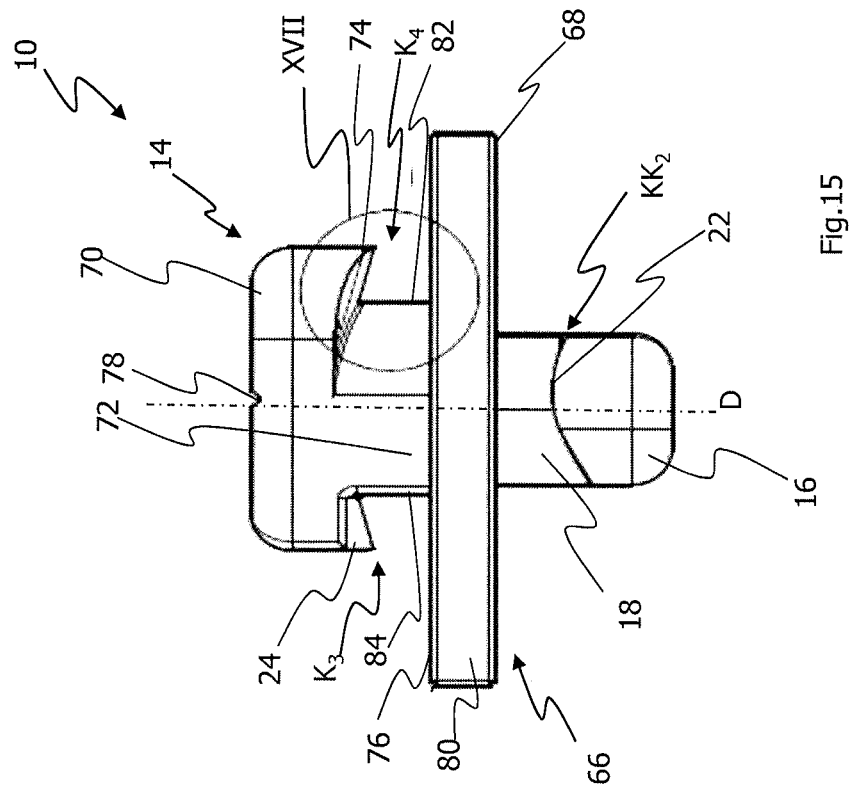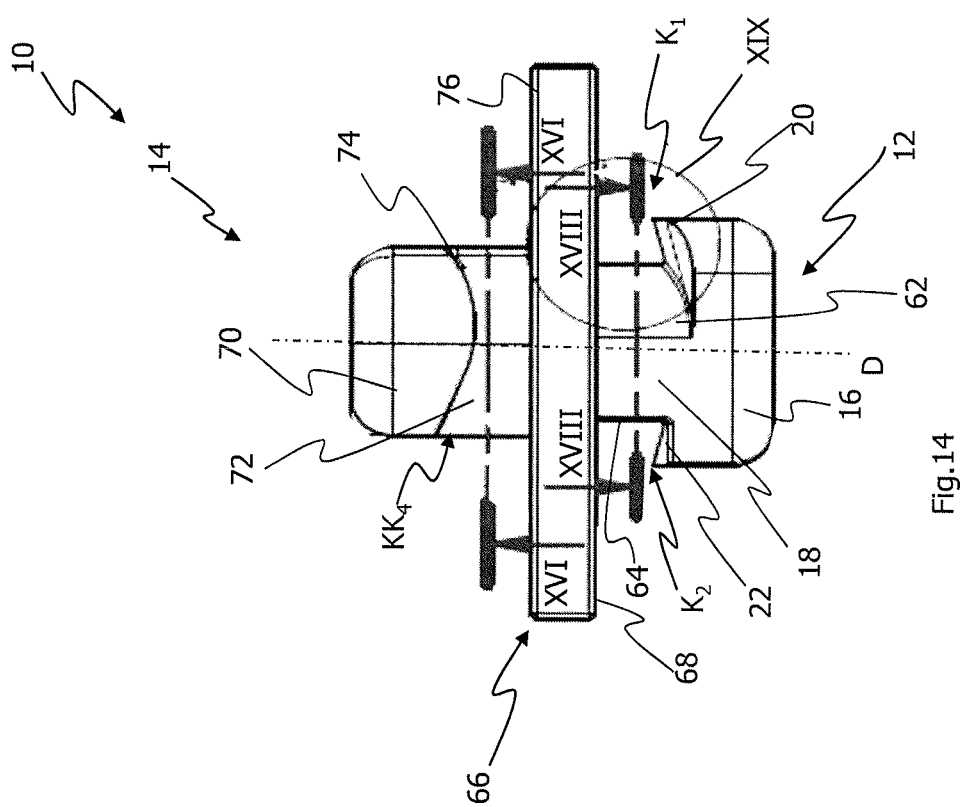

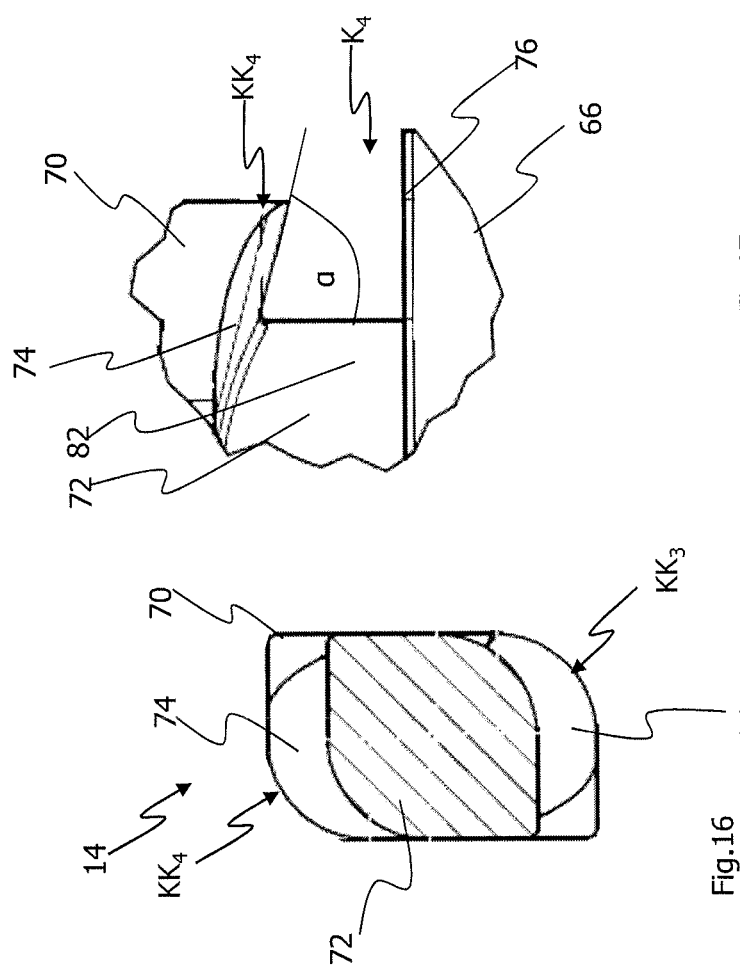

CONNECTING ELEMENT FOR CONNECTING PROFILE ELEMENTS

FIELD OF THE INVENTION

The present invention relates to a connecting element for connecting at least two profile elements. The present invention relates further to an assembly group comprising a profile element and such a connecting element.

BACKGROUND OF THE INVENTION

Such connecting elements are known from the prior art and disclosed, for example, in document DE 101 46 492 A1. The connecting element disclosed in that document consists of two toggle elements arranged at opposite ends of an intermediate piece. The toggle elements are designed to be inserted into receptions of profiles that are to be connected together. Connection of the profiles by means of the connecting element is carried out by first inserting the toggle elements into the receptions and rotating them. For rotating the connecting element, attachment surfaces in the form of a hexagon head for attachment of a spanner or the like are provided between the toggle elements. Rotationally fixed connection of the two profiles is effected in that, on rotation, the narrow sides of the toggle elements are clamped against the lateral delimiting walls of the groove-like receptions of the profiles to form protection against over-rotation.

BRIEF SUMMARY OF THE INVENTION

It is an object of the present invention to further improve such a connecting element in particular in respect of its clamping action. Furthermore, it is a further object of the present invention to provide a connecting element which allows to form an assembly group with a profile element and to be connected as an assembly group, i.e. together with the profile element, to a further profile element.

These objects are achieved according to the invention by a connecting element for connecting at least two profile elements, wherein the connecting element is rotatable about an axis of rotation in order to produce a clamping force, the connecting element comprising at least one first connecting portion and at least one second connecting portion, which are each configured to be received in one of the profile elements. The first connecting portion has at least one first clamping face, wherein the at least one first clamping face is configured with a predetermined clamping contour. The second connecting portion has at least one second clamping face, wherein the first clamping face faces the second connecting portion and the second clamping face faces the first connecting portion. The first connecting portion and the second connecting portion are so configured that the profile elements connected by means of the connecting element extend obliquely relative to one another or crosswise.

According to a further embodiment, the second connecting portion is so configured that the second connecting portion can be received in a reception in one of the two profile elements via a press fit. In another embodiment, there is formed on the second connecting portion at least one projection for support on a reception of one of the profile elements. In another embodiment, there is formed on the second connecting portion at least one projection for support on a reception of one of the profile elements. In another embodiment, the at least one first clamping face and the at least one second clamping face form between them at least one clamping channel for clamping a portion of one of the profile elements. In another embodiment, the at least one first clamping face and the at least one second clamping face form between them at least one clamping channel for clamping a portion of one of the profile elements. In another embodiment, the at least one first clamping face and the at least one second clamping face form between them at least one clamping channel for clamping a portion of one of the profile elements. In another embodiment, the at least one first clamping face and the at least one second clamping face form between them at least one clamping channel for clamping a portion of one of the profile elements. In another embodiment, the second connecting portion has at least one support face which is configured to support the second connecting portion at the reception of one of the profile elements. In another embodiment, the second connecting portion has at least one support face which is configured to support the second connecting portion at the reception of one of the profile elements. In another embodiment, the second connecting portion has at least one support face which is configured to support the second connecting portion at the reception of one of the profile elements. In another embodiment, the second connecting portion has at least one support face which is configured to support the second connecting portion at the reception of one of the profile elements. In another embodiment, there is arranged between the first connecting portion and the second connecting portion at least one bearing portion which has a third clamping face and a fourth clamping face. In another embodiment, at least one selected from the group comprising (i) the at least one first clamping face and the third clamping face define between them at least one first clamping channel and (ii) the at least one second clamping face and the fourth clamping face define between them at least one second clamping channel. In another embodiment, the second clamping face of the second connecting portion is configured with a predetermined clamping contour. In another embodiment, the second clamping face of the second connecting portion is configured with a predetermined clamping contour. In another embodiment, the clamping contour of at least one selected from the group comprising the at least one first clamping face, the first connecting portion and the at least one second clamping face of the second connecting portion have at least one selected from the group comprising a bend and an undercut. In yet another embodiment, the clamping contour of at least one selected from the group comprising the at least one first clamping face, the first connecting portion and the at least one second clamping face of the second connecting portion have at least one selected from the group comprising a bend and an undercut.

An assembly group is provided having at least one profile element and at least one connecting element for connecting at least two profile elements, wherein the connecting element is rotatable about an axis of rotation in order to produce a clamping force, the connecting element comprising at least one first connecting portion and at least one second connecting portion, which are each configured to be received in one of the profile elements. The first connecting portion has at least one first clamping face, wherein the at least one first clamping face is configured with a predetermined clamping contour. The second connecting portion has at least one second clamping face, wherein the first clamping face faces the second connecting portion and the second clamping face faces the first connecting portion. The first connecting portion and the second connecting portion are so configured that the profile elements connected by means of the connecting element extend obliquely relative to one another or crosswise. The at least one connecting element is received with its second connecting portion in the reception of the at least one profile element via a press fit. In another embodiment of the assembly group, the second connecting portion is so configured that the second connecting portion can be received in a reception in one of the two profile elements via a press fit and wherein the at least one connecting element is received with its second connecting portion in the reception of the at least one profile element via a press fit.

The connecting element for connecting at least two profile elements is rotatable about an axis of rotation in order to produce a clamping force. The connecting element has at least one first connecting portion and at least one second connecting portion, which are each configured to be received in one of the profile elements. The first connecting portion has at least one clamping face, wherein the at least one first clamping face is configured with a predetermined clamping contour. The second connecting portion has at least one second clamping face, wherein the first clamping face faces the second connecting portion and the second clamping face faces the first connecting portion. The first connecting portion and the second connecting portion are so configured that the profile elements connected by means of the connecting element extend obliquely relative to one another or crosswise.

The two connecting portions of the connecting element can each be inserted into a reception of a profile element. The clamping faces of the connecting portions can cooperate in such a manner that, by rotation of the connecting element about the axis of rotation, a clamping force is produced by the webs or projections which define the opening of the reception in the profile element. By means of the connecting element it is possible to connect two profile elements which, after connection by means of the connecting element, extend obliquely relative to one another, transversely relative to one another or crosswise. For producing a clamping force, the first clamping face, which extends at least in part obliquely relative to the axis of rotation, can engage one of the projections of the profile element which define the slot-like opening extending in the direction of the longitudinal axis. The first connecting portion and the second connecting portion can be formed on the connecting element offset relative to one another about the axis of rotation by a predetermined angle. This angle can be 90°, for example. The angle by which the first connecting portion and the second connecting portion are offset relative to one another about the axis of rotation can depend on the angle which the two profile elements, or the longitudinal axes of the profile elements, are to have relative to one another in the state in which they are connected via the at least one connecting element. The first connecting portion and the second connecting portion can also be in alignment, as seen in the direction of the axis of rotation.

The second connecting portion can be so configured that the second connecting portion can be received in a reception of one of the two profile elements via a press fit. Furthermore, the second connecting portion can be so configured that it can be pushed or inserted into the reception starting from an end face or end side of a profile element. The connecting element is displaced by means of the second connecting portion into a predefined position on the profile element. The connecting element can be positioned, for example, centrally in the reception of the profile element. The at least one connecting element and the profile element can form an assembly group which is fixedly connected together. The at least one connecting element can be connected to the profile element in a rotationally fixed manner. The connecting element can be permanently fixedly connected to the profile element.

The assembly group comprising the profile element and the pushed-in connecting element can be connected by means of the connecting element to a further profile element. To that end, the first connecting portion of the profile element is inserted into the reception of the profile element with which a connection is to be made. The assembly group can thereafter be rotated relative to that profile element about the axis of rotation of the connecting element. The amount of the relative rotation can be 90°, for example. The rotation of the connecting element can be initiated by the profile element with which the connecting element forms an assembly group. In this case, no additional tool is required to make a connection between two profile elements via the connecting element. It is sufficient to insert the first connecting portion of the connecting element into the reception of the profile element and to rotate the assembly group relative to that profile element.

On the second connecting portion there can be formed at least one projection with which the second connecting portion is supported on the reception of a profile element. It is also possible for multiple projections to be formed on the second connecting portion. By means of the projections, the second connecting portion can be supported on the walls of the groove-like reception of the profile element. For example, a projection can be formed on the upper side and a projection can be formed on each of the lateral faces of the second connecting portion. Each of these projections can be supported on a wall of the reception. For example, the projection on the upper side of the second connecting portion can be supported on the bottom face of the reception. The projections on the side faces of the second connecting portion can be supported on the lateral faces of the reception.

The at least one projection can be bent. The connecting element can be inserted in the direction of the longitudinal axis of the profile element. The at least one projection on the second connecting portion can be bent in the direction of the longitudinal axis of the profile element. As a result, the insertion or centering of the second connecting portion on the profile element can firstly be simplified. The further the second connecting portion is pushed into the reception and the further the projection is bent outwards, the greater the forces with which the connecting portion is braced in the reception of the profile element. For example, the projection on the upper side of the second connecting portion can be bent. The bend extends along the direction of insertion of the connecting element or of the second connecting portion into the reception of the profile element. As already mentioned, the second connecting portion is inserted or pushed into the reception of the profile element starting from an end face of the profile element.

The at least one first clamping face and the at least one second clamping face can form between them at least one clamping channel for clamping a portion of one of the profile elements.

The connecting portion can have at least one support face with which the second connecting portion can be supported at the reception of a profile element. The at least one support face can in particular rest against the webs or projections which define the opening of the reception. The second clamping face of the second connecting portion can extend substantially parallel to the at least one support face. Between the second clamping face and the at least one support face there can be provided a step, or a shoulder, which is formed by two guide faces. The guide faces can extend at an angle or substantially perpendicular to the second clamping face. The guide faces can further extend at an angle or substantially parallel to one another. The distance between the guide faces can be matched to the distance between the two projections which define the slot-like opening of the reception of the profile element. The webs can rest against the guide faces which connect the at least one support face to the at least one second clamping face. By means of the guide faces, the second connecting portion can be guided in the reception during insertion or pushing in. Furthermore, the guide faces can inter alia prevent the second connecting portion from being able to rotate relative to the profile element in the reception of the profile element. The second connecting portion can be held in its predetermined position and posture in the reception of the profile element by means of the distance between the guide faces and/or the dimensioning the second connecting portion. The second connecting portion can be held in its predetermined position and posture in the reception of the profile element by means of the guide faces and/or its dimensioning even when the connecting element forms an assembly group with a profile element and that assembly group, in order to produce a connection with a further profile element, is rotated relative to that profile element.

Between the first connecting portion and the second connecting portion there can be arranged at least one bearing portion. The at least one bearing portion can have at least one third clamping face and at least one fourth clamping face. The third clamping face can face the first clamping face of the first connecting portion. The fourth clamping face can face the second clamping face of the second connecting portion. The at least one first clamping face and the at least one third clamping face can define between them at least one clamping channel. Furthermore, the at least one second clamping face and the fourth clamping face can define between them at least one further clamping channel. The first connecting portion and the second connecting portion can be formed on the connecting element offset relative to one another by 90°, for example, about the axis of rotation. In particular, the at least one first clamping face and the at least one second clamping face can be formed on the connecting portions offset by 90° relative to one another about the axis of rotation. The first connecting portion and the second connecting portion can also be in alignment, as seen in the direction of the axis of rotation. The at least one first clamping face and the at least one second clamping face can likewise be in alignment, as seen in the direction of the axis of rotation.

The connecting element can have attachment faces at which a tool for rotating the connecting element can be attached. The bearing portion can be in plate form. The bearing portion can have a square, rectangular or polygonal basic shape. The third clamping face and the fourth clamping face can be provided on opposite sides of the at least one bearing portion. The first clamping face of the first connecting portion and the second clamping face of the second connecting portion can face one another and, owing to the arrangement of the bearing portion between the clamping faces of the first and of the second connecting portion, also the third and fourth clamping faces.

The connecting element can be inserted with its first connecting portion into a reception of a profile element. A second profile element is then fitted with its reception onto the second connecting portion of the connecting element. The connecting element can thereafter be rotated through 90°, for example, whereby a clamping action is produced by means of the clamping contour on the first and second clamping faces between the first clamping face, the third clamping face and one of the projections on the reception of the first profile element and between the second clamping face, the fourth clamping face and one of the projections on the reception of the second profile element. In other words, the profile elements and the connecting element are clamped together and thus connected together by the rotation of the connecting element. The profile elements then extend obliquely relative to one another or cross. The longitudinal axes of the profile elements can extend transversely or obliquely relative to one another, but may also cross.

The second clamping face of the second connecting portion can be configured with a predetermined clamping contour. The clamping contour of the second clamping face of the second connecting portion can correspond to the clamping contour of the first clamping face of the first connecting portion. The two clamping contours of the first clamping face and of the second clamping face may, however, also be different from one another.

The clamping contour of the at least one first clamping face of the first connecting portion and/or the clamping contour of the at least one second clamping face of the second connecting portion can have a bend or curve. The first and second clamping surfaces can be bent towards one another. The first clamping face can accordingly be curved in the direction of the second clamping face and the second clamping face can be curved in the direction of the first clamping face. Furthermore, the first and second clamping faces can also be curved in the direction of the third and fourth clamping faces on the at least one bearing portion. Owing to the curve of the clamping faces, a clamping force can be produced between the connecting element and the respective profile element by the rotation of the connecting element.

The clamping contour of the first clamping face and/or the clamping contour of the second clamping face can each be configured with an undercut. By means of the undercut, a relatively great clamping force can be produced. By means of the undercut, the connecting element can thus be prevented from becoming detached from one of the profile elements.

The connecting element can be produced from castable or injection moldable materials. The at least one connecting element can be produced, for example, from aluminum, zinc or fiber-reinforced plastics materials such as PE, PP, PC, POM, PET, PEEK or PA. For example, the at least one connecting element can be produced by an aluminum diecasting method or a zinc diecasting method. It is also conceivable that the connecting element is produced from several different materials.

The connecting element for connecting at least two profile elements can be so configured that the connecting element is rotatable about an axis of rotation in order to produce a clamping force, wherein the connecting element has at least one first connecting portion and at least one second connecting portion which are each configured to be received in one of the profile elements, wherein the first connecting portion has at least one first clamping face, wherein the at least one first clamping face is configured with a predetermined clamping contour, wherein the second connecting portion has at least one second clamping face, wherein the first clamping face faces the second connecting portion and the second clamping face faces the first connecting portion.

The present invention relates further to an assembly group having at least one profile element and at least one connecting element of the type described hereinbefore. The at least one connecting element is received with its second connecting portion in the reception of the at least one profile element via a press fit. The at least one connecting element of the assembly group can be inserted with the first connecting portion into a reception of a further profile element. Following insertion into the reception, the assembly group comprising the profile element and the connecting element can be rotated relative to the further profile element so that the first connecting portion can clamp the two profile elements together.

BRIEF DESCRIPTION OF THE SEVERAL VIEWS OF THE DRAWING

Exemplary embodiments will be described hereinbelow with reference to the accompanying figures, in which:

FIGS. 1 to 5 are different views of a connecting element according to a first embodiment;

FIGS. 11 to 15 are different views of a connecting element according to a second embodiment;

FIG. 16 is a sectional view along cutting line XVI-XVI in FIG. 14;

FIG. 17 is an enlarged view of detail XVII-XVII in FIG. 15;

DETAILED DESCRIPTION OF THE INVENTION

Figure 3:
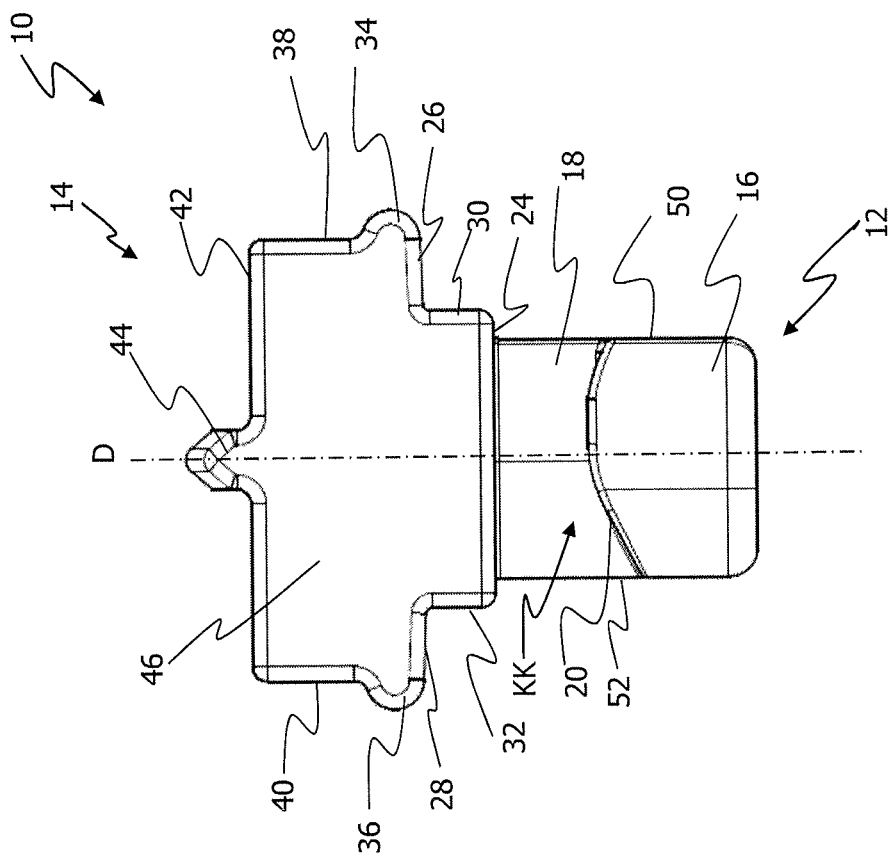

FIGS. 1 and 2 show perspective views of a connecting element 10 according to a first embodiment.

The connecting element 10 has a first connecting portion 12 and a second connecting portion 14. The first connecting portion 12 has a head portion 16 and a column-like portion 18 which connects the head portion 16 to the second connecting portion 14. On the head portion 16 there are formed the two first clamping faces 20 and 22, which point in the direction of the second connecting portion 14. The clamping faces 20 and 22 have a predetermined clamping contour. As can be seen in FIG. 1, the first clamping faces 20 and 22 have a clamping contour which has a bend or curve. An undercut with which the clamping contours of the clamping faces 20 and 22 are provided is also only adumbrated in FIG. 1. In this context, the expression "clamping faces" is to be understood as meaning faces which come into contact with at least one of the profile elements (not shown) that are to be connected by means of the connecting element 10, or which rest against one of the profile elements.

The second connecting portion 14 has a second clamping face 24 which points in the direction of the first clamping faces 20, 22. Adjoining the second clamping face 24 is a step or shoulder which forms the transition into support faces 26 and 28. By means of the spacing faces 26, 28, the second connecting portion 14 is able to be supported against the reception (not shown) of a profile element (not shown). The spacing faces 26, 28 are connected by means of guide faces 30 and 32 to the second clamping face 24. The guide faces 32 and 34 extend substantially perpendicularly to the support faces 26, 28 and the second clamping face 24. The guide faces 30, 32 can guide the insertion movement of the second connecting portion 14 into a reception, not shown, of a profile element (not shown) and prevent rotation of the second connecting portion 14 relative to the profile element (not shown). Adjoining the support faces 26 and 28 are two projections 34 and 36 which are formed on the lateral faces 38 and 40 of the second connecting portion 14. Adjoining the lateral faces 38 and 40 is a top face 42 of the second connecting portion 14, which connects the lateral faces 38 and 40 to one another. The top face 42 has a projection 44. The projection 44 is provided with a bend, as is visible in FIGS. 1 and 2. The second connecting portion 14 further has a front face 46 and a rear face 48 which extend between the second clamping face 24, the guide faces 28, 30, the support faces 26, 28, the lateral faces 38, 40 and the top face 42.

FIG. 3 shows a front view of the connecting element 10. In FIG. 3, the first connecting portion 12 and the second connecting portion 14 can be seen. The first connecting portion 12 has the head portion 16 and the column-like portion 18 which connects the first connecting portion 12 to the second connecting portion 14. In particular, the portion 18 of the first connecting portion 12 is connected to the second clamping face 24 of the second connecting portion 14. The portion 18 of the first connecting portion 12 is arranged centrally on the second clamping face 24. The second clamping face 24 extends around the end of the portion 18. On the head portion 16 there is formed the first clamping face 20, which points in the direction of the second clamping face 24 on the second connecting portion 14. The clamping face 20 has a predetermined clamping contour KK. As can be seen in FIG. 3, the clamping contour KK of the first clamping face 20 is in bent form. The clamping face 20 extends between the lateral faces 50 and 52 of the first connecting portion. Starting from the left lateral face 52 in FIG. 3, the clamping face 20 extends bent in the direction of the axis of rotation D, wherein the bend has its apex in the region of the axis of rotation D. After the apex, which is located in the region of the axis of rotation D in the view according to FIG. 3, the clamping face 20 falls with a slight bend in the direction of the right lateral face 50 in FIG. 3 of the first connecting portion 12. The starting point of the clamping face 20 on the lateral face 52 lies in the direction of the axis of rotation D beneath the end point of the clamping face 20 on the lateral face 50. By means of the clamping contour KK of the clamping face 20, a profile element (not shown) can be clamped between the first clamping face 20 and the second clamping face 24 opposite the first clamping face 20 by rotation about the axis of rotation D of the connecting element 10. The second clamping face 24 according to this embodiment extends substantially perpendicularly to the axis of rotation D.

Figure 4:
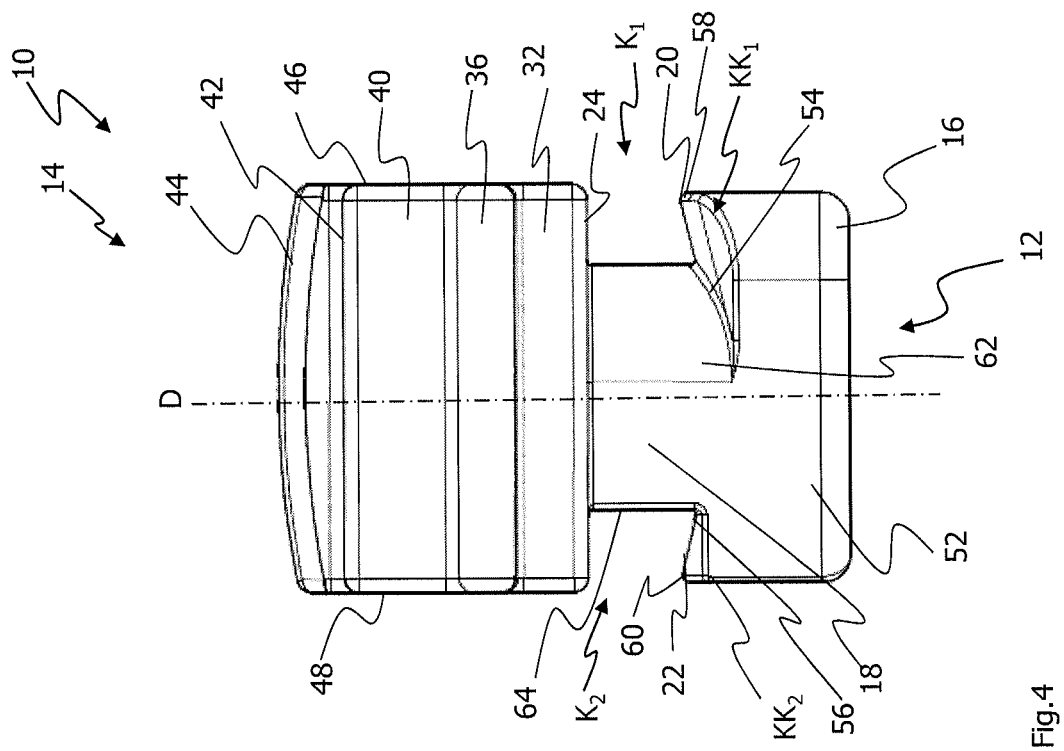

FIG. 4 is a side view of the connecting element 10. The head portion 16 of the first connecting portion 12 has the two clamping faces 20 and 22. The clamping faces 20 and 22 each have a predetermined clamping contour $KK_1$ and $KK_2$. The clamping contours $KK_1$ and $KK_2$ are bent and have an undercut. The undercut of the clamping contours $KK_1$ and $KK_2$ is recognizable in that the edges 54 and 56, which extend along the portion 18, are located at least in part in the direction of the axis of rotation D beneath the outer edges 58 and 60 of the clamping faces 20 and 22. The further the clamping faces 20 and 22 extend away from the axis of rotation D, the greater the extent of the head portion 16 in the direction of the axis of rotation.

The projection 44 is bent in form. The bend of the projection 44 extends in a direction transverse to the axis of rotation D. The apex of the bend of the projection 44 lies in the region of the axis of rotation D.

The first clamping face 20 and the clamping face 24 define between them a first clamping channel $K_1$. The first clamping face 22 and the second clamping face 24 define between them a second clamping channel $K_2$. The clamping faces 20 and 22 are opposite the clamping face 24. In a direction transverse to the axis of rotation D, the clamping channels $K_1$ and $K_2$ are delimited by means of the wall faces 62 and 64 of the portion 18 of the first connecting portion 12. Owing to the undercut and owing to the bend of the clamping faces 20 and 22 in the direction of the second clamping face 24, the cross-section of the clamping channels $K_1$ and $K_2$ changes in a direction about the axis of rotation D. Owing to this cross-section of the clamping channels $K_1$ and $K_2$, the clamping force increases the further the connecting element 10 is rotated relative to the profile element (not shown) which can be connected to the first connecting portion 12. For example, the clamping contours $KK_1$ and $KK_2$, or the cross-section of the clamping channels $K_1$ and $K_2$ resulting therefrom, can be so configured that the clamping force is greatest when the connecting element 10 has been rotated through about 90° about the axis of rotation D relative to the profile element (not shown) which is to be clamped to the first connecting portion 12.

Figure 5:
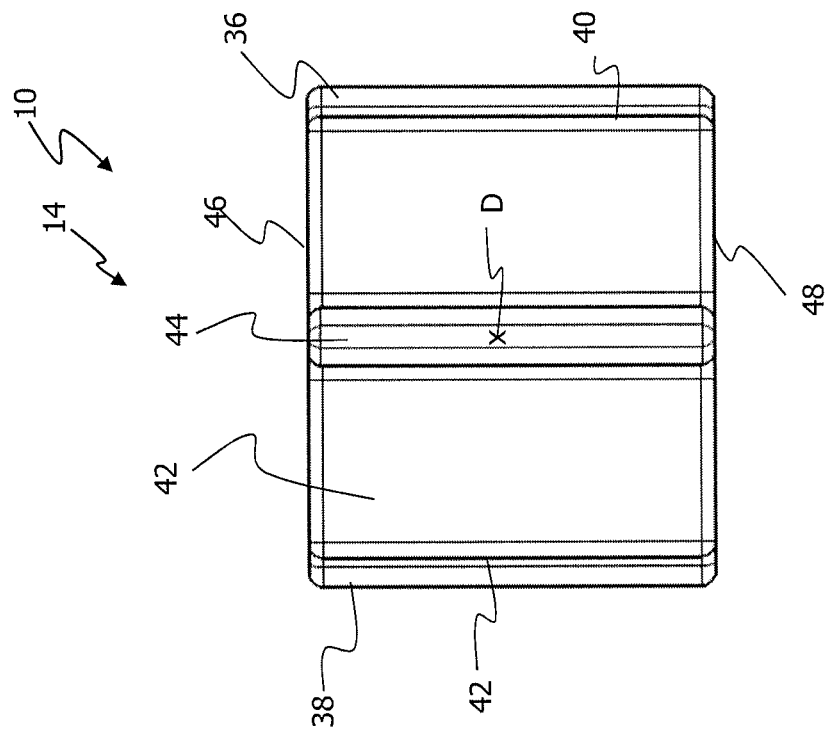

FIG. 5 is a plan view of the connecting element 10. In FIG. 5, the top face 42 of the connecting element 10 is shown. The top face 42 has the projection 44. On the lateral faces 40 and 42 of the second connecting portion 14 there are formed the projections 36 and 38. The connecting portions 12 and 14 can be in alignment, as seen in the direction of the axis of rotation D (see also FIGS. 3 and 4).

Figure 6:
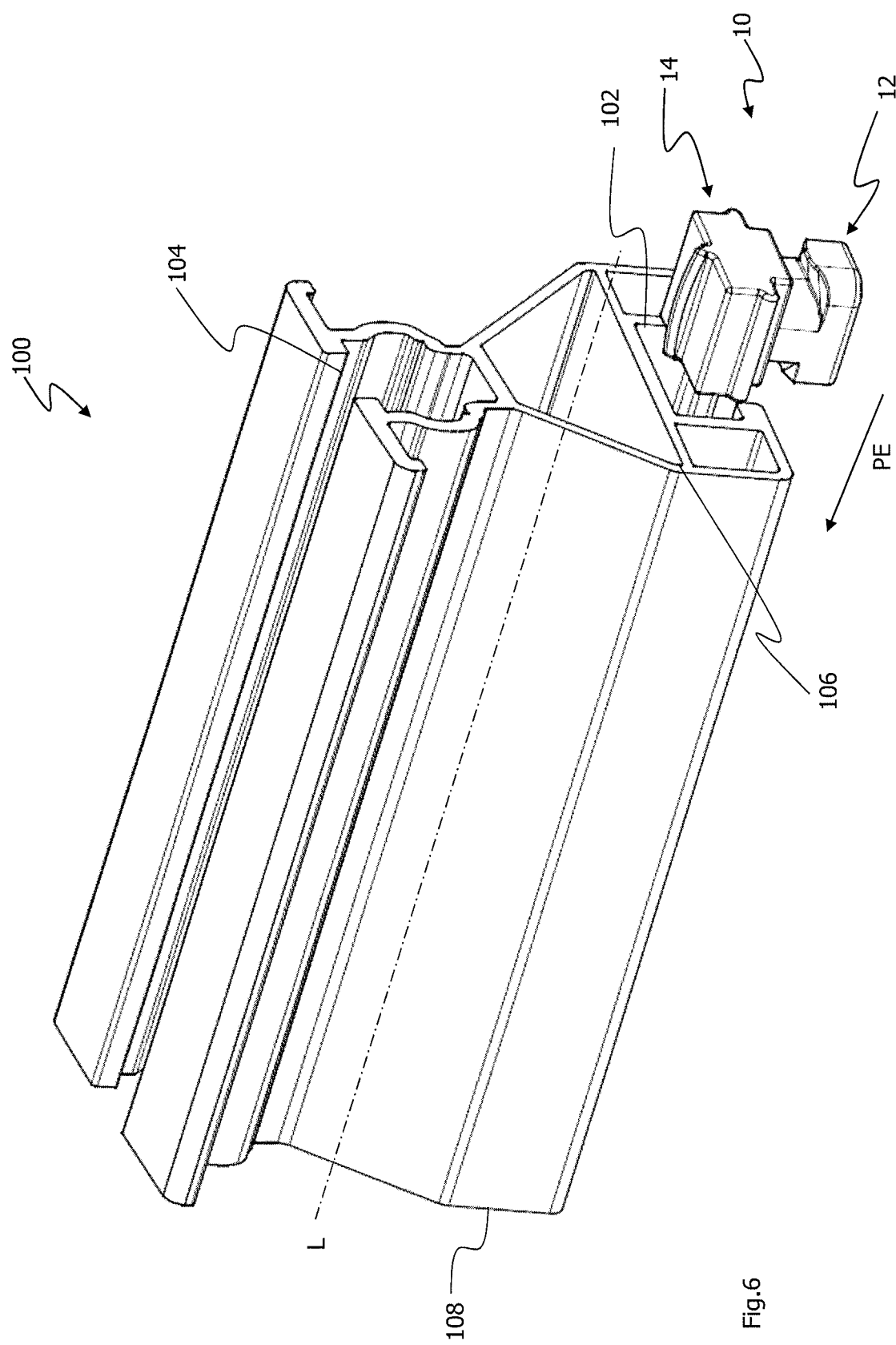
FIG. 6 is a perspective view of a profile element and of a connecting element according to the first embodiment before connection to form an assembly group.

FIG. 6 is a perspective view of a profile element 100 and of the connecting element 10 according to the first embodiment. The profile element 100 and the connecting element 10 can be connected together in order to form an assembly group. In order to form an assembly group, the connecting element 10 is inserted with its second connecting portion 14 into a reception 102 of the profile element 100. The profile element 100 has, in addition to the reception 102, a further reception 104 on its upper side. The connecting element 10 is inserted or pushed into the reception 102 from the end side 106. The connecting element 10 is inserted with its second connecting portion 14 in the direction of the longitudinal axis L of the profile element 100. The insertion direction is again represented by the arrow PE in FIG. 6. It is, however, also possible to introduce the connecting element 10 into the reception 102 of the profile element 100 starting from the end side 108.

Figure 7:
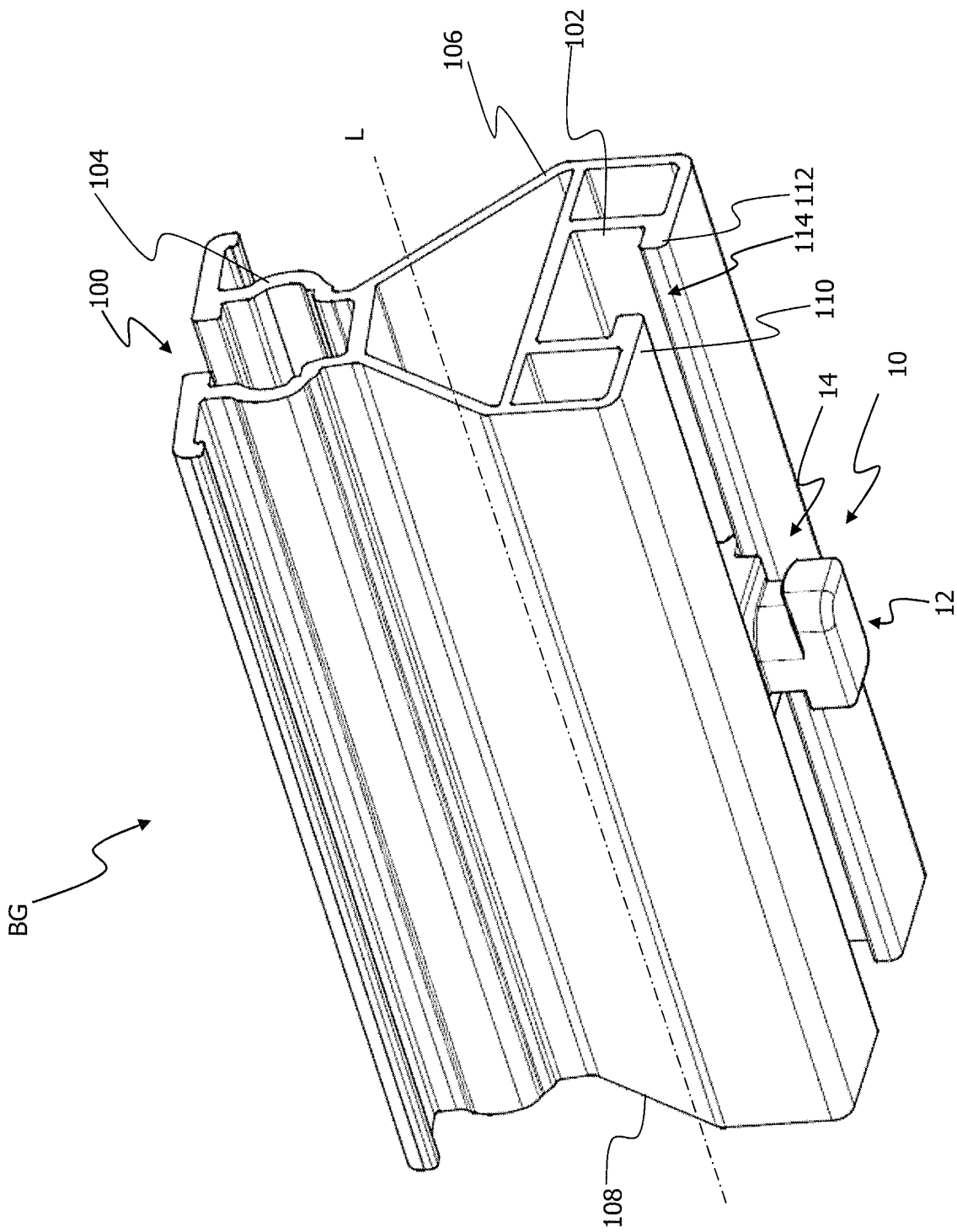
FIG. 7 is a perspective view of the assembly group formed by a profile element and the connecting element according to the first embodiment.

In FIG. 7, the connecting element 10 has been pushed into the reception 102 of the profile element 100. The connecting element 10 is positioned substantially centrally in the reception 102 of the profile element 100 in the direction of the longitudinal axis L. The reception 102 is rectangular in cross-section and has two webs or projections 110 and 112 which define a slot-like opening 114 extending in the direction of the longitudinal axis L. The second connecting portion 14 of the connecting element 10 is received in the reception 102 of the profile element 100 by a press fit. The profile element 100 and the connecting element 10 form an assembly group BG. The assembly group BG can be connected by means of the connecting portion 12 to a further profile element (not shown). The profile element 100 can be a support for the solar modules, for example.

Figure 8:
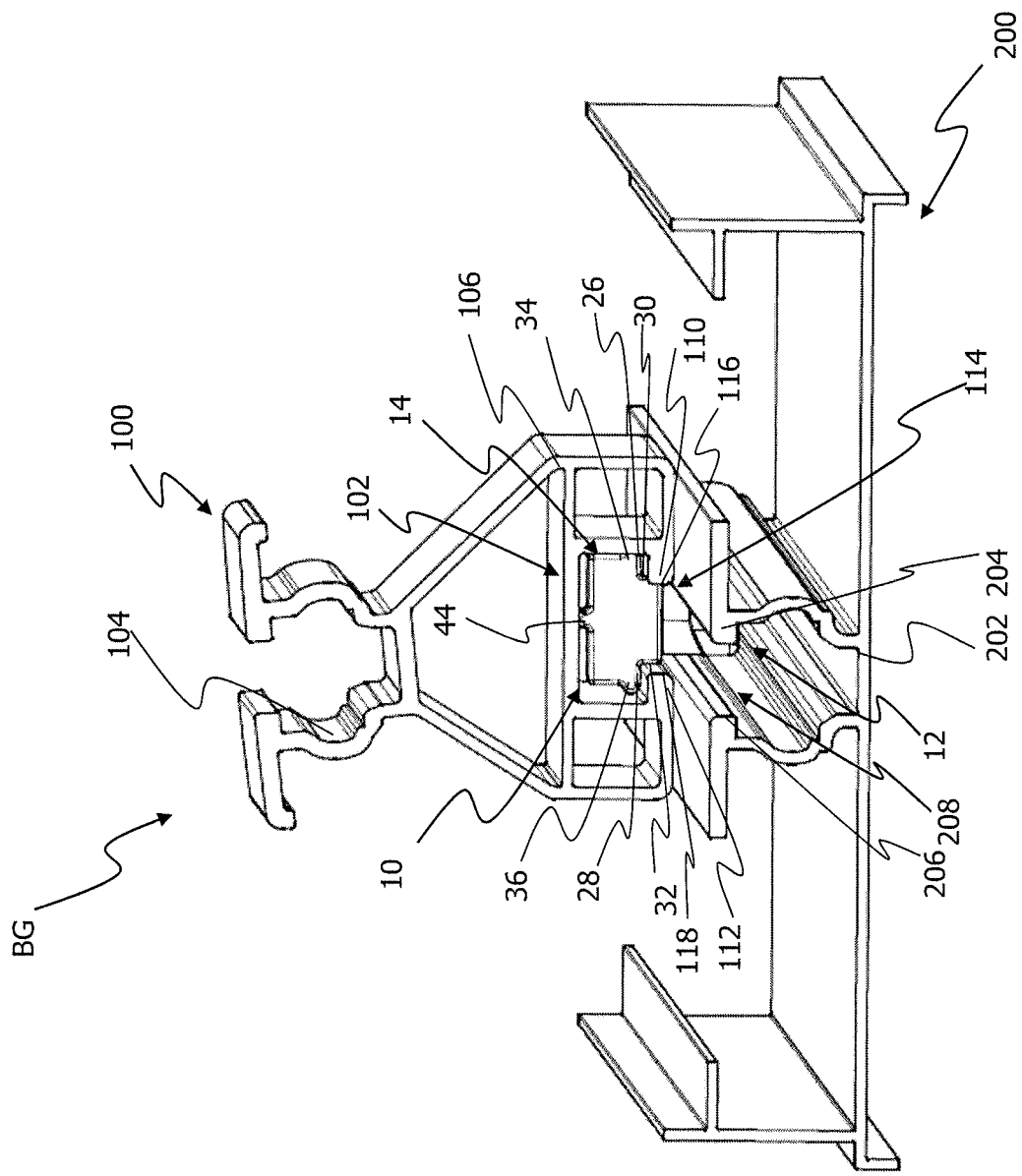
FIG. 8 is a perspective view of the assembly group according to FIG. 7, wherein the first connecting portion of the connecting element of the assembly group has been inserted into a reception of a further profile element.

FIG. 8 is a perspective view of the assembly group BG in the state in which it has been inserted but not yet fixedly connected to a further profile element 200. The profile element 200 has a reception 202 into which the first connecting portion 12 of the connecting element 10 has been inserted. The profile element 100 of the assembly group BG lies with its lower side against the upper side of the reception 202 of the profile element 200. The reception 202 of the profile element 200 has webs or projections 204, 206 which delimit a slot-like opening 208. Through the opening 208, the second connecting portion 12 of the connecting element 10 has been inserted into the reception 202.

The second connecting portion 14 of the connecting element 10 is, as has already been described in connection with FIG. 7, received in the reception 102 of the profile element 100 via a press fit. The second connecting portion 14 is supported by means of the projections 34, 36 and 44 on the wall faces of the reception 102. The support faces 26 and 28 lie against the projections 110 and 112 of the reception 102. The guide faces 30, 32 lie against the mutually opposite delimiting faces 116, 118 of the projections 110, 112 which delimit the opening 114. The region of the second connecting portion 14 between the guide faces 30, 32 is received between the delimiting faces 116, 118 on the projections 110, 112.

In FIG. 8, the first connecting portion 12 has been inserted into the reception 202 of the profile element 200 but is not yet fixedly connected to the profile element 200. Insertion into the reception 202 can take place from above through the opening 208 of the reception 202. The connecting element 10, and thus the assembly group BG, is not yet fixedly connected to the profile element 200 since the assembly group BG has not yet been rotated relative to the profile element 200. In this state, the profile elements 100 and 200 still extend "parallel" to one another.

Figure 9:
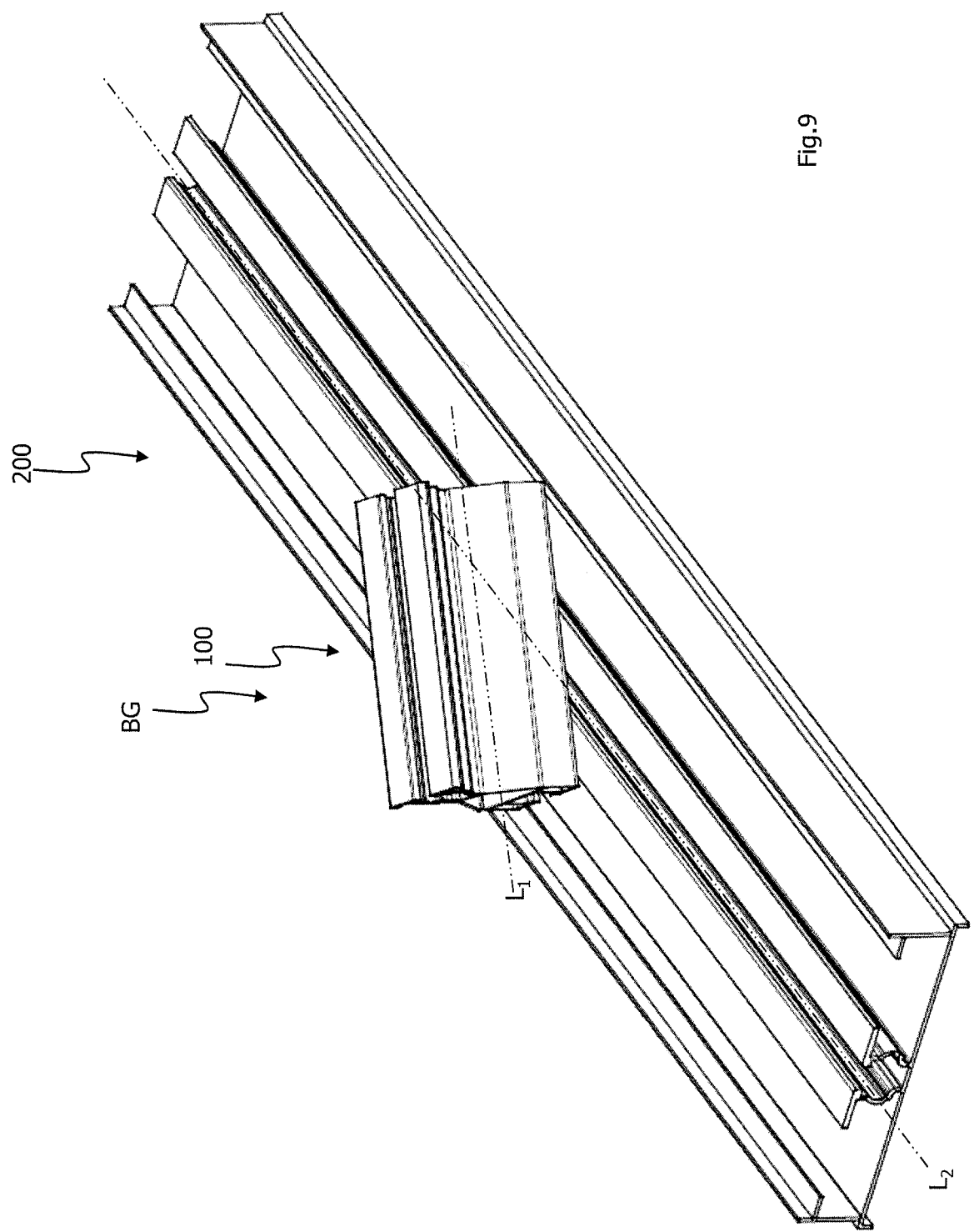
FIG. 9 is a perspective view of the assembly group and of the profile element according to FIG. 8, wherein the assembly group has been rotated through 45° relative to the profile element.

FIG. 9 is a perspective view in which the assembly group BG has been rotated relative to the profile element 200. In FIG. 9, only the profile element 100 of the assembly group BG is visible. The profile element 100 extends obliquely relative to the profile element 100. The longitudinal axis $L_1$ of the profile element 100 extends obliquely relative to the longitudinal axis $L_2$ of the profile element 200. The profile element 100 has been rotated through about 45° relative to the profile element 200 in FIG. 9.

Figure 10:
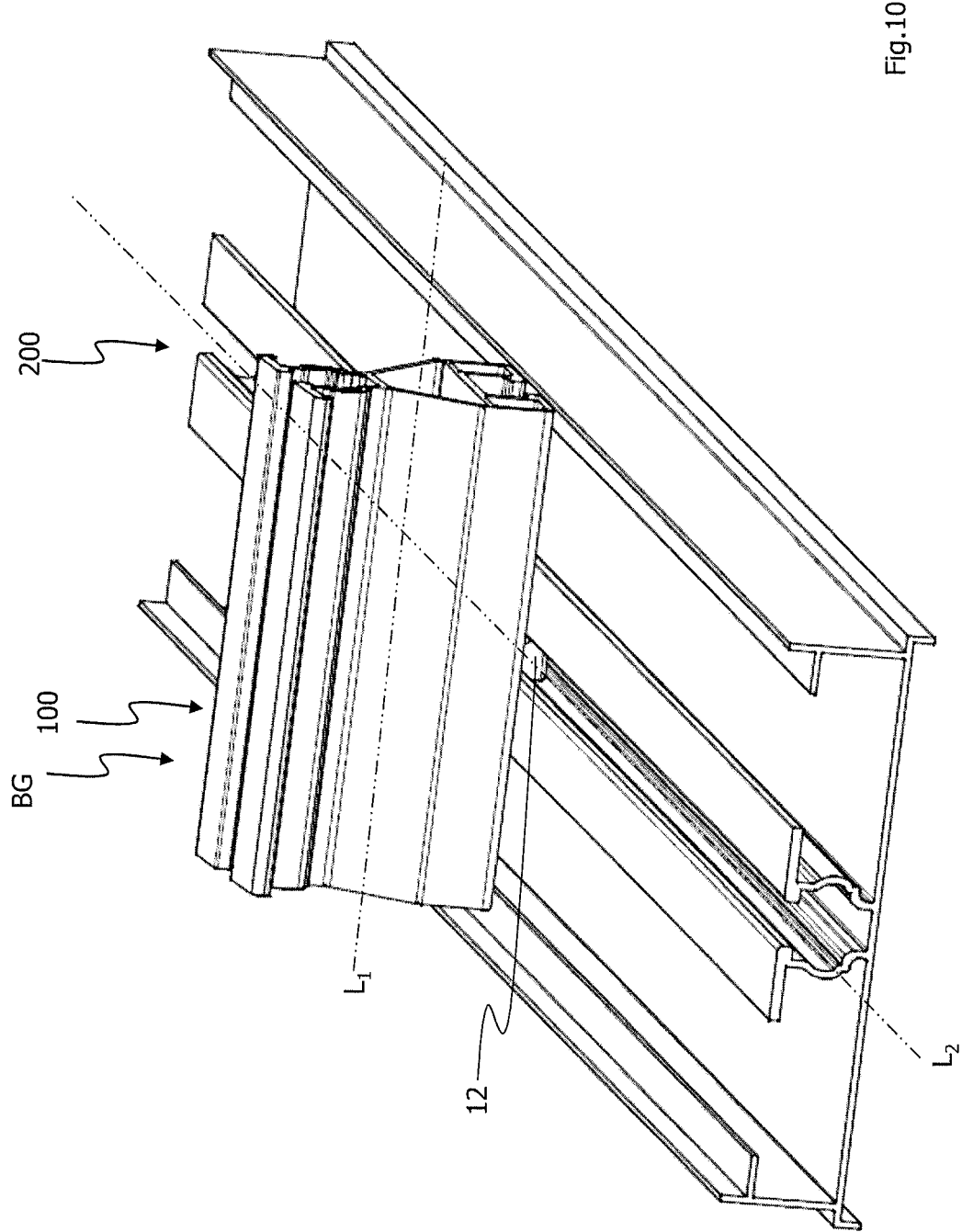
FIG. 10 is a perspective view of the assembly group and of the profile element in the connected state, that is to say the assembly group has been rotated through about 90° relative to the profile element.

In FIG. 10, the assembly group BG is shown in the state in which it is fixed to the profile element 200. Starting from the intermediate position of the assembly group BG shown in FIG. 9, the assembly group BG, that is to say the profile element 100 and the connecting element 10, has been rotated further into the end position shown in FIG. 10. The assembly group has been rotated through 90° relative to the profile element 200. In this state, the clamping faces 20, 22 and 24 (see FIGS. 1 to 4) of the connecting element 100 lie against the projections 204 and 206 of the reception 202 of the profile element 200. The clamping contours $KK_1$ and $KK_2$ (see FIG. 4) of the clamping faces 20 and 22, together with the clamping face 24, produce a clamping action for holding the assembly group BG on the profile element 200. In this state, the profile element 100 of the assembly group BG extends transversely to the profile element 200. The longitudinal axis $L_1$ of the profile element 100 and the longitudinal axis $L_2$ of the profile element 200 extend crosswise.

A connecting element 10 according to a second embodiment will be described hereinbelow with reference to FIGS. 11 to 21. For features or components which are the same or have the same effect, the same reference numerals as in the first embodiment are used. In order to avoid repetition, the differences between the two embodiments will be described in detail hereinbelow. Components and features which have already been described in relation to the first embodiment will not be described in detail again. The description of these components and features also applies analogously to the second embodiment.

Figure 11:
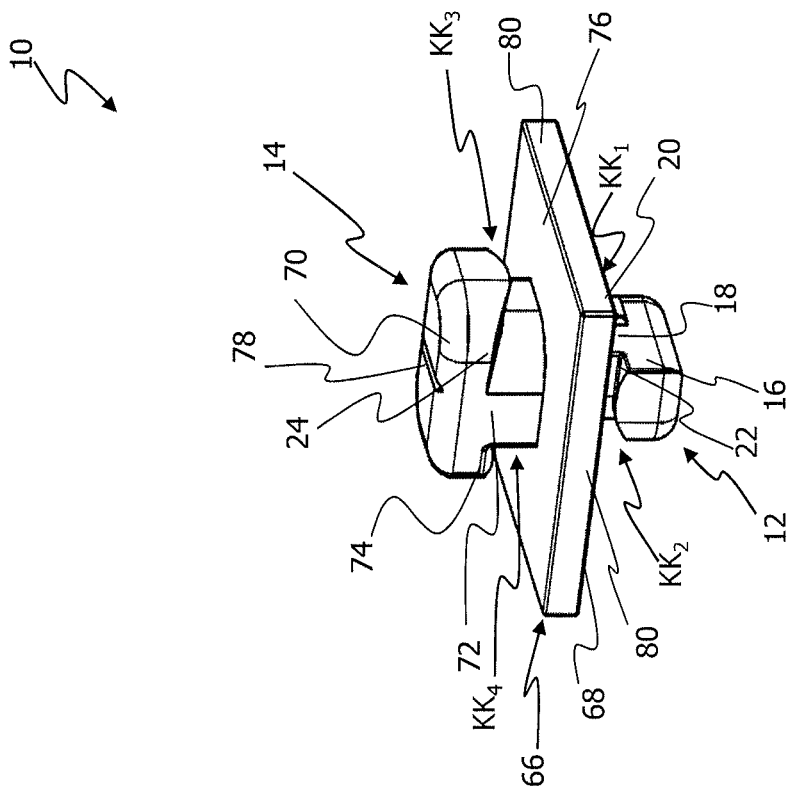
Figure 12:
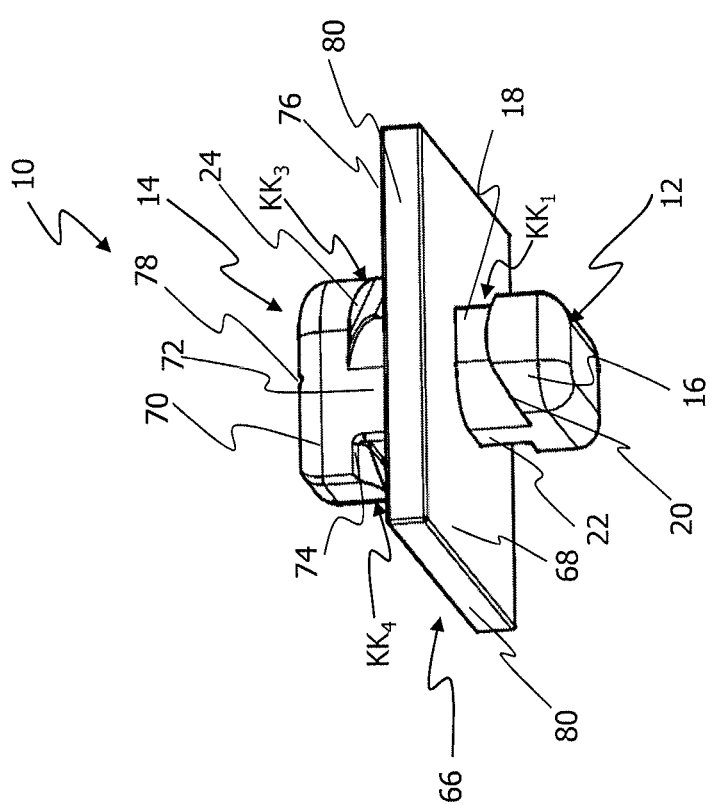

FIGS. 11 and 12 are perspective views of a connecting element 10 according to the second embodiment. The connecting element 10 according to the second embodiment has a first connecting portion 12, a second connecting portion 14 and a bearing portion 66. The bearing portion 66 is arranged between the first connecting portion 12 and the second connecting portion 14. The first connecting portion 12 and the second connecting portion 14 are of substantially identical construction, wherein the second connecting portion 14 is arranged on the bearing portion 66 offset by 90° relative to the first connecting portion 12. The remarks made in relation to the first connecting portion 12 according to the first embodiment thus apply analogously to the two connecting portions 12 and 14 according to the second embodiment.

The first connecting portion 12 has a head portion 16 and a column-like portion 18 which connects the first connecting portion 12 to the bearing portion 66. On the head portion 16 there are formed first clamping faces 20 and 22, which face a clamping face 68 on the bearing portion 66. The clamping faces 20 and 22 have a predetermined clamping contour $KK_1$ and $KK_2$.

The second connecting portion has a head portion 70 and a column-like portion 72 which connects the second connecting portion 14 to the bearing portion 66. On the head portion 70 there are formed clamping faces 24 and 74, which face a clamping face 76 on the bearing portion 66. The clamping faces 24 and 74 are offset by 90° relative to the clamping faces 20 and 22 of the first connecting portion 12. On the upper side of the head portion 70 of the second connecting portion there is visible a slot 78 which marks the upper side or the upper portion of the connecting element 10.

The bearing portion 66 is in plate form according to this embodiment and has a square basic shape. The lateral faces 80 of the bearing portion 66 form attachment faces for the attachment of a tool for mounting the connecting element 10. The attachment faces 80 can be so-called spanner flats to which a tool similar to a spanner can be attached.

FIG. 13 is a plan view of the connecting element 10. In FIG. 13, the second connecting portion 14 and the bearing portion 66 are shown. The bearing portion 66 is square and plate-like in form. On the bearing portion 66 there are formed four attachment faces 80 to which a tool for rotating the connecting element 10 can be attached. On the upper side of the second connecting portion 14 there is shown the slot 78 which marks the upper side or the upper portion of the connecting element 10.

FIGS. 14 and 15 are views of the connecting element 10 from different viewing directions. For reasons of clarity, not all the features have been provided with reference numerals in the two figures. In connection with the first connecting portion 12, reference is also made, in order to avoid repetition, to the detailed description of the first connecting portion 12 in connection with the first embodiment described hereinbefore.

The first connecting portion 12 has a head portion 16 and a column-like portion 18 which connects the first connecting portion 12 to the bearing portion 66. The first connecting portion 12 has on its head portion 16 two clamping faces 20 and 22 which have a predetermined clamping contour $KK_1$ and $KK_2$ (see FIGS. 4 and 14). The clamping faces 20 and 22 face a clamping face 68 on the bearing portion 66. The clamping face 68 extends substantially perpendicularly to the axis of rotation D. The clamping faces 20 and 22, together with the clamping face 68, define two clamping channels $K_1$ and $K_2$ which are associated with the first clamping portion 12. The clamping channels $K_1$ and $K_2$ are further delimited by the wall portions 62 and 64 on the portion 18, which delimit the clamping channels $K_1$ and $K_2$ in a direction transverse to the axis of rotation D.

The second connecting portion 14 has a head portion 70 and a column-like portion 72. The column-like portion 72 connects the head portion 70 to the bearing portion 66. On the head portion 70 there are formed two clamping faces 24 and 74. The clamping faces 24 and 74 have predetermined clamping contours $KK_3$ and $KK_4$ (see FIGS. 11 and 12). The clamping faces 24 and 74 face the clamping face 76 on the bearing portion 66. The clamping face 76 extends substantially perpendicularly to the axis of rotation D. The clamping faces 24 and 74, together with the clamping face 76 on the bearing portion 66, define two clamping channels $K_3$ and $K_4$. The clamping channels $K_3$ and $K_4$ are further delimited by the wall portions 82 and 84 on the portion 72, which delimit the clamping channels $K_3$ and $K_4$ in a direction transverse to the axis of rotation D.

FIG. 16 is a sectional view along cutting line XVI-XVI in FIG. 14. In FIG. 16, the head portion 70 and the column-like portion 72 are shown. On the head portion 70 there are formed the clamping faces 24 and 74. The clamping faces 24 and 74 each have a predetermined clamping contour $KK_3$ and $KK_4$. The clamping faces 24 and 74 extend, starting from the lateral wall faces 82 and 84 of the portion 72, at an angle to those wall faces 82 and 84. The wall faces 82 and 84 extend between the lateral faces 86 and 88 of the first connecting portion 14. The wall faces 82 and 84 have a straight portion and a bent portion. Starting from one of the lateral faces 86 and 88, the wall faces 82 and 84 extend with their straight portion first substantially at a right angle to one of those lateral faces 86 and 88. With the bent portion, the wall faces 82 and 84 then merge into the respective other lateral face 86 and 88 of the first connecting portion 14.

FIG. 17 is an enlarged view of detail XVII in FIG. 15. The clamping faces 74 and 76, together with the wall face 82 of the portion 72, define the clamping channel $K_4$. The clamping face 74 has a predetermined clamping contour $KK_4$ which is provided with an undercut. The undercut is formed by an angle α between the clamping face 74 and the wall face 82, which extends parallel to the axis of rotation D (see FIG. 15). The angle α can be between 45° and 85°. For example, the angle α can be 75°.

Figure 18:
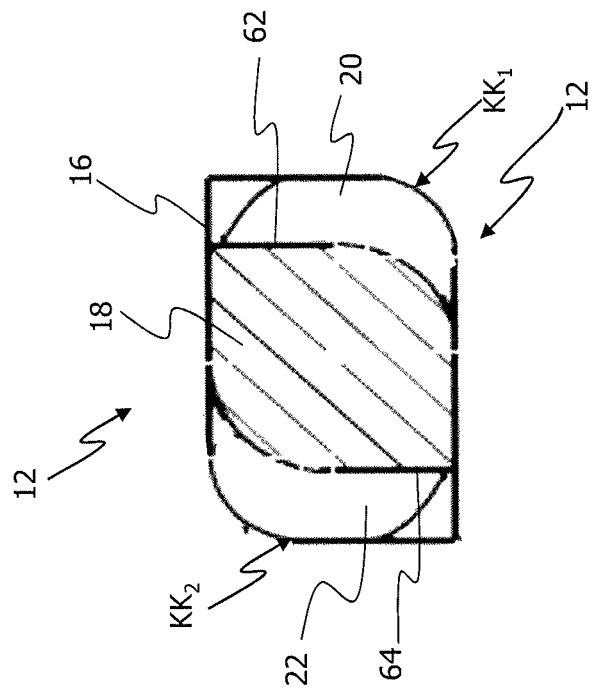
FIG. 18 is a sectional view along cutting line XVIII-XVIII in FIG. 14.

FIG. 18 is a sectional view along cutting line XVIII-XVIII in FIG. 14. In FIG. 18, the first connecting portion 12 is shown. On the head portion 16 of the first connecting portion 12 there are formed the clamping faces 20 and 22. The clamping faces 20 and 22 each have a predetermined clamping contour $KK_1$ and $KK_2$. The clamping faces 20 and 22 extend starting from the lateral wall faces 62 and 64 of the portion 18, that is to say the clamping faces 20 and 22 do not surround the column-like portion 18 completely. The wall faces 62 and 64 extend between the lateral faces 52 and 54 of the first connecting portion 12 at an angle to those wall faces 50 and 52. The wall faces 62 and 64 have a straight portion and a bent portion. Starting from one of the lateral faces 50, 52, the wall faces 62 and 64 extend with their straight portion first substantially at a right angle to that lateral face 50 and 52. With the bent portion, the wall faces 62 and 64 then merge into the respective other lateral face 50 and 52 of the first connecting portion 12.

Figure 19:
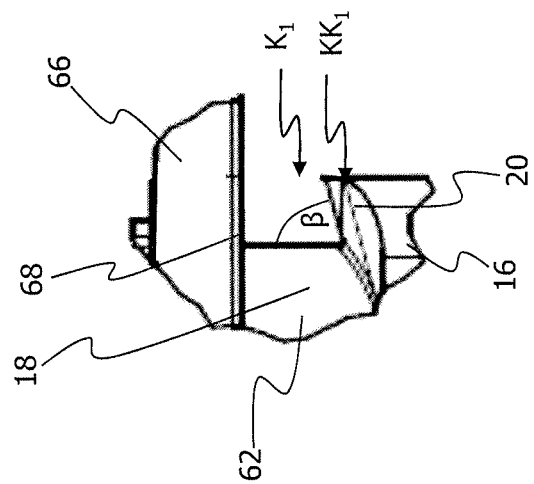
FIG. 19 is an enlarged view of detail XIX in FIG. 14.

FIG. 19 is an enlarged view of detail XIX in FIG. 14. The clamping faces 20 and 68, together with the wall portion 62, define a clamping channel $K_1$. The cross-section of the clamping channel K1 changes in a direction about the axis of rotation D. In particular, the cross-section of the clamping channel $K_1$ becomes smaller the further the clamping face 20 extends away from the axis of rotation D (see FIG. 14). The clamping contour $KK_1$ of the clamping face 20 has an undercut. The undercut is formed by an angle β between the clamping face 20 and the wall face 62, which extends parallel to the axis of rotation D (see FIG. 15). The angle β can be between 45° and 85°. For example, the angle β can be 77°.

Figure 20:
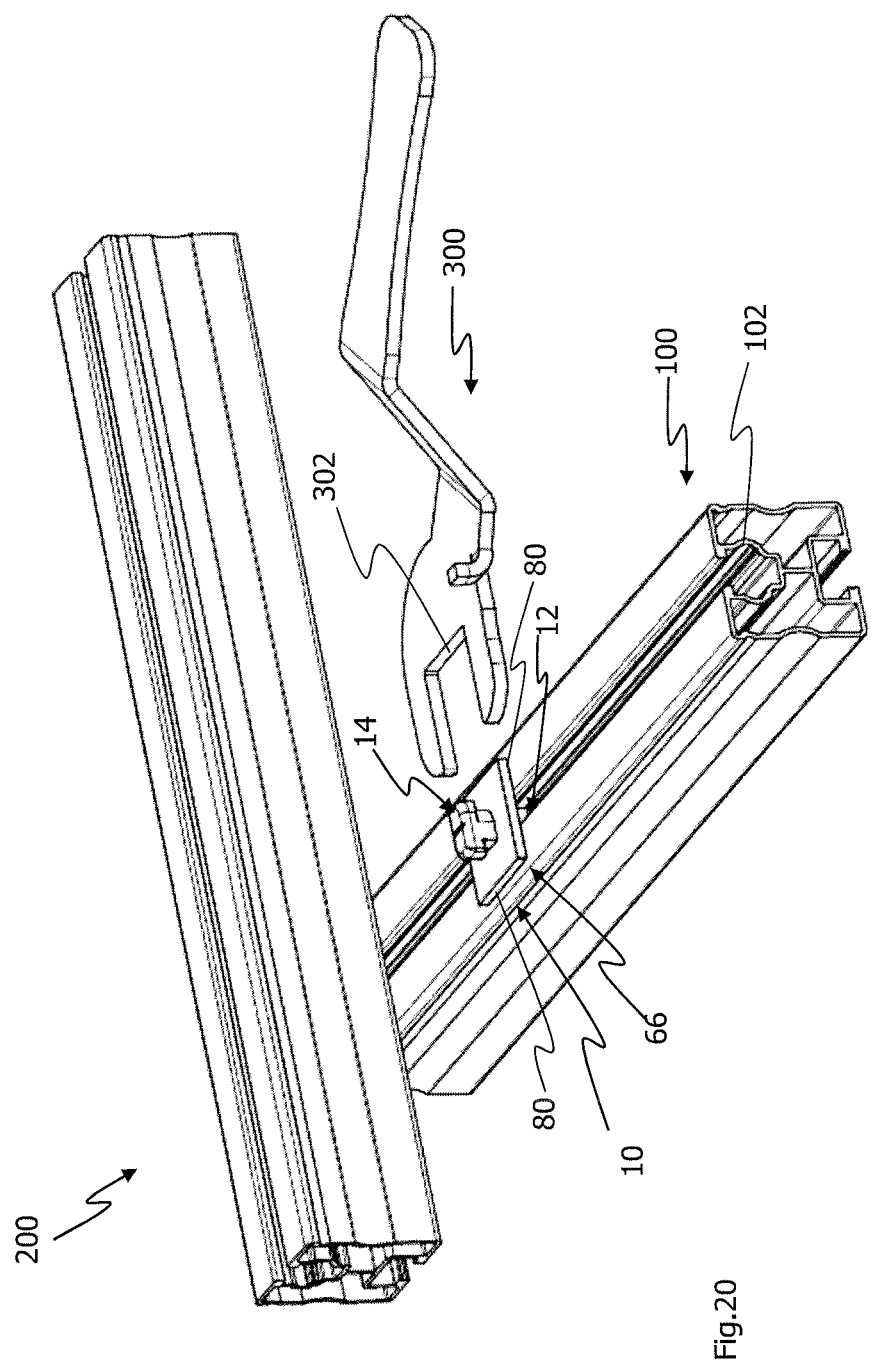
FIGS. 20 and 21 are views of the mounting of the connecting element according to the second embodiment.

FIG. 20 is a perspective view of the connecting element 10 according to the second embodiment in the state in which it has been inserted in a profile element 100. By means of the connecting element 10, the two profile elements 100, 200 are to be connected. For this purpose, the connecting element 10 has been inserted with its first connecting portion 12 (see FIGS. 14 and 15) into the reception 102 of the profile element 100. In order to be able to connect the two profile elements 100 and 200 together, the connecting element 10 must be rotated relative to the two profile elements 100, 200. Rotation takes place by means of the spanner 300 shown in FIG. 20. The spanner 300 has a spanner reception 302 in which the plate-like bearing portion 66 can be received. The spanner can be attached by its spanner reception 302 to the lateral attachment faces 80 of the bearing portion 66 (not shown). The connecting element 10 lies with its bearing portion 66 against the profile element 100 and the connecting portion 12 is received in the reception 102. Although the connecting element 10 is received with its first connecting portion 12 in the reception 102, it is not yet clamped to the profile element 100. For this purpose, the connecting element 10 must be rotated relative to the two profile elements 100, 200 after the profile element 200 has been fitted to the second connecting portion 14 of the connecting element 10.

Figure 21:
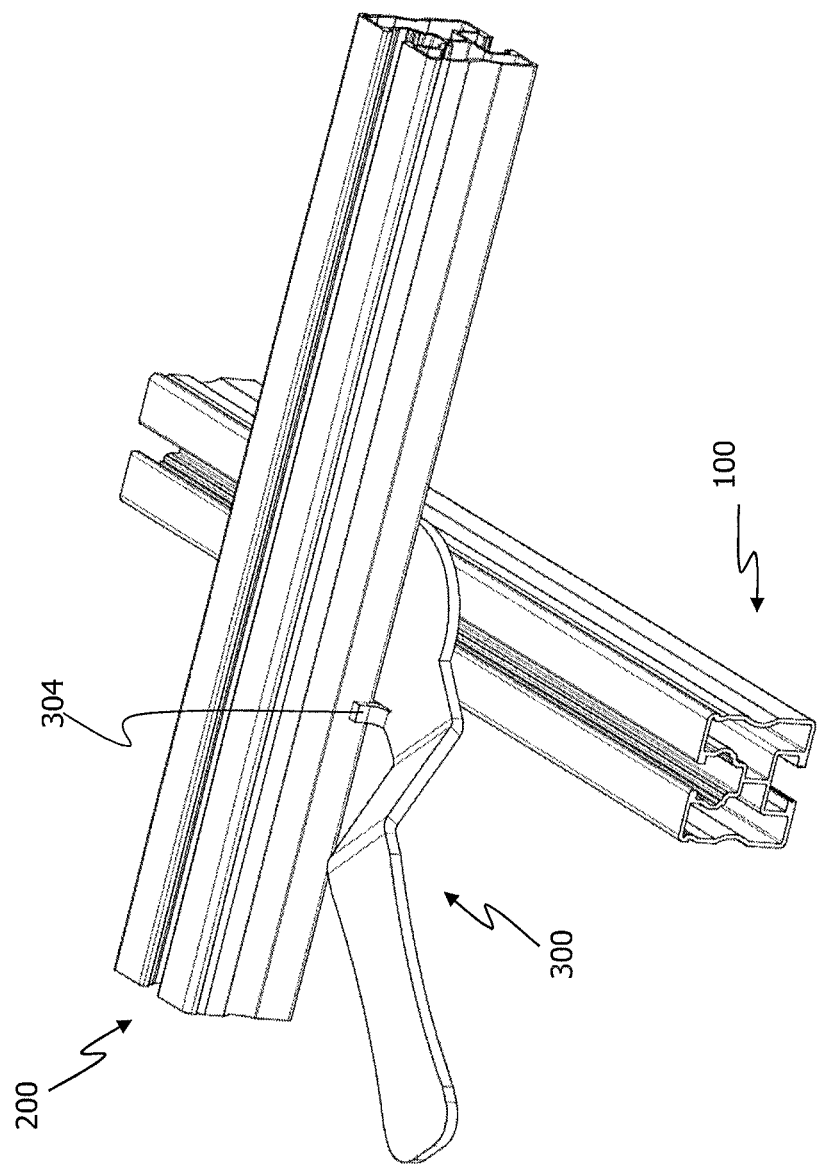

In FIG. 21, the profile elements 100, 200 have been connected by means of the connecting element 10. For this purpose, the connecting element 10 (see FIG. 20) was rotated through 90° relative to the profile elements 100, 200 by means of the spanner 300. That rotation has already taken place in FIG. 21 is made clear in that the spanner 300 is lying with its stop 304 against the profile element 200. The contact of the stop 304 with the profile element 200 makes it clear that the amount of rotation of the connecting element 10 necessary to connect the two profile elements 100, 200 has been performed.

The bearing portion 66 has a predetermined thickness in the direction of the axis of rotation D (see FIGS. 14 and 15). The thickness of the bearing portion 66 allows the spanner 300 to be attached and removed from the region between the two profile elements 100, 200 even when the two profile elements 100, 200 are connected together, as is shown in FIG. 21. The thickness of the spanner 300 is accordingly matched to the thickness of the bearing portion 66. The thickness of spanner 300 can be equal to or slightly smaller than the thickness of the bearing portion 66.

The invention claimed is:

1. A connecting element for connecting at least two profile elements, wherein the connecting element is a monobloc, which is rotatable about an axis of rotation in order to produce a clamping force, the connecting element comprising:
   at least one first connecting portion and at least one second connecting portion with the axis of rotation extending therebetween, which are each configured to be received in an internal, longitudinal channel of each of the profile elements;
   wherein the first connecting portion has at least one first clamping face, wherein the at least one first clamping face is configured with a predetermined clamping contour;
   wherein the second connecting portion has at least one second clamping face, wherein the first clamping face faces the second connecting portion and the second clamping face faces the first connecting portion
   wherein the first connecting portion and the second connecting portion are disposed at a non-zero angle with respect to each other about the axis of rotation;
   wherein rotating the connecting element about the axis of rotation produces the clamping force between the first and second connecting portions and the internal, longitudinal channels of the at least two profile elements; and
   wherein the first connecting portion and the second connecting portion are so configured that the profile elements connected by means of the connecting element extend obliquely relative to one another or crosswise.

2. The connecting element as claimed in claim 1, wherein the second connecting portion is so configured that the second connecting portion can be received in a reception in one of the two profile elements via a press fit.

3. The connecting element as claimed in claim 2, wherein there is formed on the second connecting portion at least one projection for support on a reception of one of the profile elements.

4. The connecting element as claimed in claim 3, wherein the at least one first clamping face and the at least one second clamping face form between them at least one clamping channel for clamping a portion of one of the profile elements.

5. The connecting element as claimed in claim 2, wherein the at least one first clamping face and the at least one second clamping face form between them at least one clamping channel for clamping a portion of one of the profile elements.

6. The connecting element as claimed in claim 2, wherein the second connecting portion has at least one support face which is configured to support the second connecting portion at the reception of one of the profile elements.

7. The connecting element as claimed in claim 2, wherein the second clamping face of the second connecting portion is configured with a predetermined clamping contour.

8. The connecting element as claimed in claim 2, wherein the clamping contour of at least one selected from the group comprising the at least one first clamping face, the first connecting portion and the at least one second clamping face of the second connecting portion have at least one selected from the group comprising a bend and an undercut.

9. An assembly group having at least one profile element and at least one connecting element as claimed in claim 2, wherein the at least one connecting element is received with its second connecting portion in the reception of the at least one profile element via a press fit.

10. The connecting element as claimed in claim 1, wherein there is formed on the second connecting portion at least one projection for support on a reception of one of the profile elements.

11. The connecting element as claimed in claim 10, wherein the at least one first clamping face and the at least one second clamping face form between them at least one clamping channel for clamping a portion of one of the profile elements.

12. The connecting element as claimed in claim 10, wherein the second connecting portion has at least one support face which is configured to support the second connecting portion at the reception of one of the profile elements.

13. The connecting element as claimed in claim 1, wherein the at least one first clamping face and the at least one second clamping face form between them at least one clamping channel for clamping a portion of one of the profile elements.

14. The connecting element as claimed in claim 13, wherein the second connecting portion has at least one support face which is configured to support the second connecting portion at the reception of one of the profile elements.

15. The connecting element as claimed in claim 1, wherein the second connecting portion has at least one support face which is configured to support the second connecting portion at the reception of one of the profile elements.

16. The connecting element as claimed in claim 1, wherein there is arranged between the first connecting portion and the second connecting portion at least one bearing portion which has a third clamping face and a fourth clamping face.

17. The connecting element as claimed in claim 16, wherein at least one selected from the group comprising (i) the at least one first clamping face and the third clamping face define between them at least one first clamping channel and (ii) the at least one second clamping face and the fourth clamping face define between them at least one second clamping channel.

18. The connecting element as claimed in claim 1, wherein the second clamping face of the second connecting portion is configured with a predetermined clamping contour.

19. The connecting element as claimed in claim 1, wherein the clamping contour of at least one selected from the group comprising the at least one first clamping face, the first connecting portion and the at least one second clamping face of the second connecting portion have at least one selected from the group comprising a bend and an undercut.

20. An assembly group having at least one profile element and at least one connecting element as claimed in claim 1, wherein the at least one connecting element is received with its second connecting portion in the reception of the at least one profile element via a press fit.

* * * * *